United States Patent [19]

Yamagata et al.

[11] Patent Number: 5,473,471
[45] Date of Patent: Dec. 5, 1995

[54] COMPLEX LENS WITH DIFFRACTION GRATING

[75] Inventors: Michihiro Yamagata, Osaka; Yasuhiro Tanaka, Ashiya, both of Japan

[73] Assignee: Matsushita Electric Industrial Co., Ltd., Osaka, Japan

[21] Appl. No.: 111,896

[22] Filed: Aug. 26, 1993

[30] Foreign Application Priority Data

Apr. 16, 1993 [JP] Japan .................................. 5-090288

[51] Int. Cl.⁶ .............................. G02B 5/18; G02B 3/08
[52] U.S. Cl. .................... 359/569; 359/566; 359/571; 359/574; 359/741; 357/742; 369/109
[58] Field of Search ..................... 359/566, 569, 359/741, 742, 570, 571, 574; 369/109

[56] References Cited

U.S. PATENT DOCUMENTS

| | | | |
|---|---|---|---|
| 4,161,040 | 11/1992 | Yokoyama et al. | 359/742 |
| 4,545,646 | 10/1985 | Chern et al. | |
| 4,968,117 | 11/1990 | Chern et al. | |
| 5,066,138 | 11/1991 | Toide et al. | 369/44.23 |
| 5,111,448 | 5/1992 | Komma et al. | 369/44.23 |
| 5,161,057 | 11/1992 | Johnson | 359/566 |
| 5,260,828 | 11/1993 | Londono et al. | 359/742 |

FOREIGN PATENT DOCUMENTS 1-146143  6/1989  Japan .
2-83228   3/1990  Japan .

OTHER PUBLICATIONS

G. Bouwhuis, et al., Principles of Optical Disc Systems, Chapter 2, pp. 70–75, Published by Adam Hilger, 1985.

*Primary Examiner*—Georgia Y. Epps
*Assistant Examiner*—Michael A. Papalas
*Attorney, Agent, or Firm*—Wenderoth, Lind & Ponack

[57] ABSTRACT

A complex lens of one-piece construction has first and second lens surfaces opposite to each other. At least one of the first and second lens surfaces of the complex lens is integrally formed with a diffraction grating. This diffraction grating has a multiplicity of substantially parallel grating grooves each being of a generally triangular, sinusoidal or trapezoidal cross-section. An optical head utilizing the complex lens is also disclosed.

6 Claims, 4 Drawing Sheets

COMPLEX LENS WITH DIFFRACTION GRATING

BACKGROUND OF THE INVENTION

1. Field of the Invention

The present invention generally relates to an optical lens element and, more particularly, to a complex lens of one-piece construction integrated with a diffraction grating. The present invention also relates to an optical head for accomplishing tracking control on a three-beam scheme which utilizes the one-piece lens integrated with the diffraction grating.

2. Description of the Prior Art

An optical head in an optical information recording and/or reproducing apparatus operates to selectively write or read information on or from an information recording medium. During the operation of the optical information recording and/or reproducing apparatus, a beam of light must necessarily be focused on the track on the information recording medium accurately and, for this purpose, an objective lens in the optical head is controlled to accomplish the tracking control.

In the prior art optical head, a diffraction grating is employed to separate a diverging beam of light from a light source into a zero-order diffracted ray of light (main beam) and two first-order diffracted rays of light (sub-beams). These rays of light are rendered substantially parallel by a collimator lens and are subsequently focused by the objective lens on the information recording medium.

Rays of light reflected from the information recording medium are, after having been rendered parallel by the objective lens, diffracted in a direction different from that along which the beam from the light source travels and towards a light receiving element, through a detection lens system. The light receiving element has a sensor region onto which reflected rays of light of the main beam are received, and two sensor regions onto which reflected rays of light of the respective sub-beams are received. A displacement in tracking can be detected in terms of the difference between the respective intensities of the reflected rays of light of the associated sub-beams, so that a tracking control signal can be obtained to drive the objective lens for compensating for the displacement in tracking. (See, for example, G. Bouwhuis, et al., "Principles of Optical Disc Systems", Chap. 2, published by Adam Hilger, 1985.)

In general, in the event that the diffraction grating is installed having been displaced in position or tilts relative to an optical axis, the prior art optical head poses a problem in that the spacing between the respective light spots formed on the information recording medium by the main beam and the sub-beams deviates to such an extent as to result in an instable tracking control.

Also, while the diffraction gratings generally employed in the prior art optical head have a multiplicity of parallel grooves of a generally rectangular cross-section, it has been observed that, when a beam impinges upon this diffraction grating, not only are the zero- and ± first-order diffracted rays of light produced, but ± second or higher order diffracted rays of light, which are unnecessary for the optical head, are also produced. This tends to adversely affect the maximized utilization of the rays of light emitted by the light source and, also, since a change in ratio between the intensity of the zero-order diffracted ray and that of the ± first-order diffracted rays is sensitive to the depth of each groove in the diffraction grating, even a slight deviation in the depth of the grating grooves during the manufacture of the diffraction grating results in a variation in ratio between the intensity of the zero-order diffracted ray and that of the ± first-order diffracted rays.

SUMMARY OF THE INVENTION

The present invention has been devised with a view to eliminating the foregoing problems and is intended to provide a novel complex lens wherein the sensitivity of the intensity ratio of the diffracted rays of light relative to a change in depth of grating grooves of the diffraction grating is moderate and wherein the generation of unnecessary high order diffracted rays of light is minimized.

Another important object of the present invention is to provide a novel complex lens of the type referred to above, wherein the diffraction grating is integrally formed with the lens element to thereby avoid the possibility that, if the diffraction grating and the lens element separate from the diffraction grating are employed, a displacement in position may occur in one of the elements relative to the other of the elements.

It is a related object of the present invention to provide an improved optical head utilizing the novel complex lens of the type referred to above.

For this purpose, the present invention provides a complex lens of one-piece construction having first and second lens surfaces opposite to each other. At least one of the first and second lens surfaces of the complex lens is integrally formed with a diffraction grating. This diffraction grating has a multiplicity of substantially parallel grating grooves each being of a generally triangular, sinusoidal or trapezoidal cross-section.

According to the present invention, not only can the generation of the unnecessary high order diffracted rays of light be minimized, but also the amount of change of the ratio of the intensity of the zero-order diffracted ray of light to that of the ± first order diffracted rays of light with respect to the change in depth of each grating groove can be lessened. For this reason, where the complex lens of the present invention is utilized in a three-beam tracking optical head, a maximized utilization of the laser beam is possible and, even though a variation occurs in the grating grooves to a certain extent, a stable intensity ratio can be secured, making it possible to increase the manufacturing yield.

As a method of accomplishing mass-production of lenses, a glass molding process has been developed and largely practiced. However, partly because, where the diffraction grating has a multiplicity of grating grooves of a generally rectangular cross-section, a suitable molding die is difficult to make, and partly because separation of the molded glass article from the molding die cannot be achieved with no difficulty, the glass molding process hitherto known in the art is not suited for the mass-production of the glass lenses.

However, where the diffraction grating has a multiplicity of grating grooves of a generally triangular, sinusoidal or trapezoidal cross-section such as are achieved in the present invention, having a gentle angle of inclination, a molding die suited for the production thereof can easily be assembled or manufactured. Also, a satisfactory separation can be provided between the glass lens and the molding die, making it possible for the complex lens of the present invention to be mass-produced by the use of the known glass molding technique.

As is well known to those skilled in the art, the glass material has a minimized deterioration in characteristics with changes in ambient parameters, such as temperature and/or humidity, as compared with synthetic resin. Therefore, the complex lens of the present invention, if made of glass material by the use of the glass molding technique, has a minimized variation in focal length and aberration and, therefore, even a single lens element, such as the complex lens of the present invention, can be utilized as a collimator lens.

Where in place of the separate collimator lens and diffraction grating, both employed in the prior art optical head operable on a three-beam tracking control scheme, the complex lens of the present invention is employed, any possible displacement in the angle of diffraction resulting from an error in positioning the collimator lens relative to the diffraction grating is absolutely eliminated, making it possible to accomplish the stable tracking control on the three-beam tracking control scheme and, at the same time, the number of necessary component parts is advantageously minimized.

The unique cross-sectional configuration of the grating grooves in the complex lens of the present invention is also effective to minimize the generation of the unnecessary second or higher order diffracted rays of light as compared with that exhibited by the prior art diffraction grating having the grating grooves of the generally rectangular cross-section, making it possible to achieve a maximized utilization of the laser beam.

BRIEF DESCRIPTION OF THE DRAWINGS

The above and other objects and features of the present invention will become clear from the following description taken in conjunction with preferred embodiments thereof, and with reference to the accompanying drawings, in which.

DETAILED DESCRIPTION OF THE PREFERRED EMBODIMENTS

Figure 1:
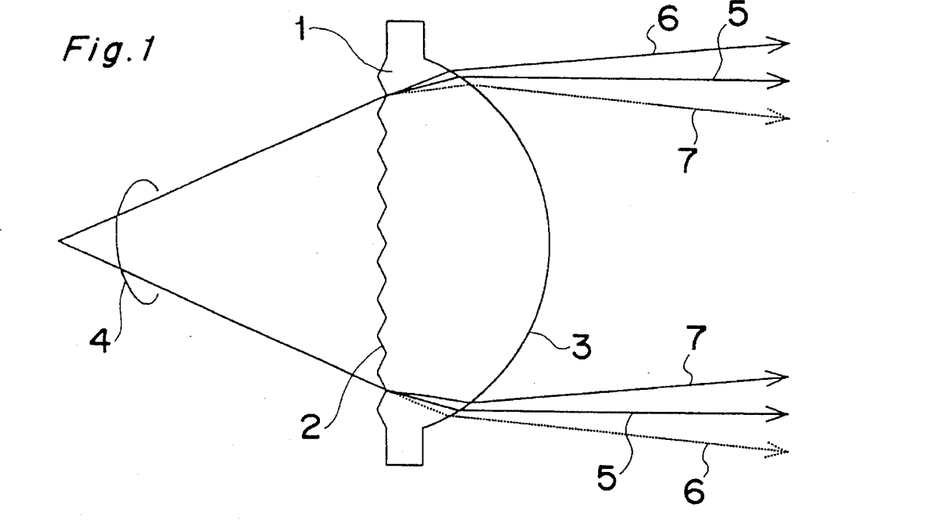
FIG. 1 is a schematic side representation of a complex lens according to a first preferred embodiment of the present invention, showing how rays of light travel across the complex lens.
Figure 2:
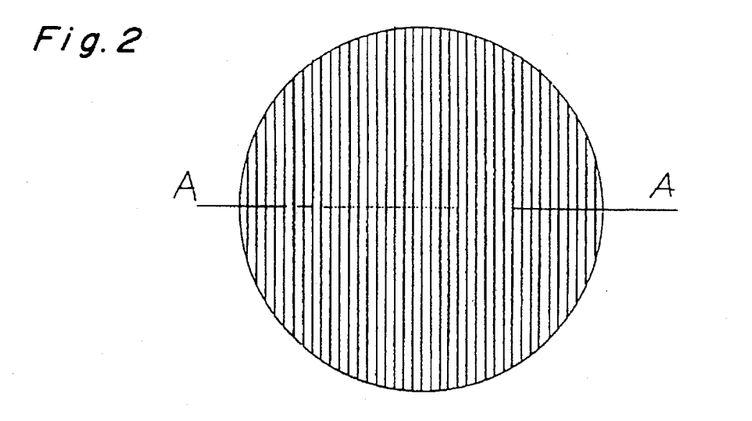
FIG. 2 is a plan view of the complex lens.

Referring to FIGS. 1 and 2 showing a first preferred embodiment of the present invention, a complex lens generally identified by 1 in FIG. 1 is in the form of a plano-convex lens having flat and convex lens surfaces 2 and 3. The flat lens surface 2 of the plano-convex lens is, in accordance with the present invention, formed with a diffraction grating to complete the complex lens 1.

In FIG. 1, reference numeral 4 represents a bundle of diverging rays of light emitted from a light source; reference numeral 5 represents a zero-order diffracted ray of light; and reference numerals 6 and 7 represents a + first-order diffracted ray of light and a − first-order diffracted rays of light.

As indicated above, and also as best shown in FIG. 1, the flat surface 2 of the plano-convex lens is formed with the diffraction grating. Therefore, the rays of light 4 from the light source are, as they pass across the complex lens 1, diffracted by the diffraction grating to provide the generally parallel rays of light 5, 6 and 7 that emerge outwardly from the convex lens surface 3 of the complex lens 1. A plan representation of the diffraction grating formed on the flat lens surface 2 of the complex lens 1 is shown in FIG. 2. It is to be noted that the sectional representation of the complex lens shown in FIG. 1 corresponds to a cross-section taken along the line A—A shown in FIG. 2.

Figure 3:
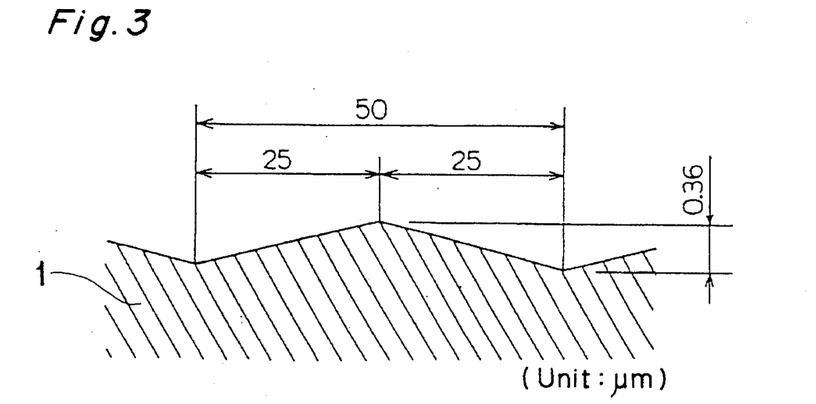
FIG. 3 is a fragmentary sectional representation, on an enlarged scale, of a portion of the complex lens of FIG. 1, showing the details of grating dimensions.

Referring now to FIG. 3 showing the details of a portion of the diffraction grating formed on the flat lens surface 1, the diffraction grating according to the first preferred embodiment of the present invention has a periodic structure of parallel grating ridges each being of a generally saw-tooth configuration. The dimensions of each grating ridge are shown therein in units of micrometers.

The diffraction grating formed on the flat lens surface 2 of the complex lens 1 according to the first preferred embodiment of the present invention has the following characteristics, wherein $I_1/I_0$ represents the ratio of the intensity of the ± first-order diffracted rays of light relative to that of the zero-order diffracted ray of light and $I_2/I_0$ represents the ratio of the sum of the respective intensities of the ± second- or higher order diffracted rays of light relative to the intensity of the zero-order diffracted ray of light:

| Wavelength Used: | 785 nm |
| Refractive Index of Glass Material: | 1.598799 |
| Grating Pitch: | 50 μm |
| 1st-order Diffraction Angle: | 0.9° |
| Depth of Grating Groove: | 0.360 μm |
| $I_1/I_0$ Ratio: | 0.150 |
| $I_2/I_0$ Ratio: | 0.020 |

The intensity ratio of the diffracted rays of light varies with the depth of each grating groove. If the allowance for the ratio $I_1/I_0$ is given within the range of, for example, 0.15±0.05, the tolerance of the groove depth is within the range of 0.307 to 0.418 μm.

Considering that an equivalent allowance is given to the prior art diffraction grating having a multiplicity of parallel ridges of generally rectangular cross-section, the tolerance of the groove depth will be within the range of 0.193 to 0.256 μm. Therefore, it is clear that, where the grating grooves are so shaped as shown in FIGS. 1 and 3 according to the present invention, the tolerance which is about 1.7 times that afforded in the prior art diffraction grating can be secured, making it possible to increase the yield of manufacture of the complex lens elements.

Also, while the ± second or higher order diffracted rays of light are not required in the optical head, the use of the complex lens according to the present invention is effective to reduce the unnecessary diffracted rays of light down to 30% of that observed in the prior art diffraction grating and is therefore effective to maximize the utilization of the light. In addition, while the manufacture of the prior art diffraction grating involves problems in that formation of grating grooves of a generally rectangular cross-section in a molding die is difficult to achieve and in that the molded diffraction grating is difficult to separate from the molding die, the present invention is effective to eliminate these problems because each grating ridge in the diffraction grating formed on the flat lens surface 2 of the complex lens 1 is of a generally saw-tooth configuration having opposite sides inclined moderately, that is, at an angle of 0.7°. For this reason, the complex lens according to the present invention can easily and economically be manufactured by the use of a glass molding process.

Figure 4:
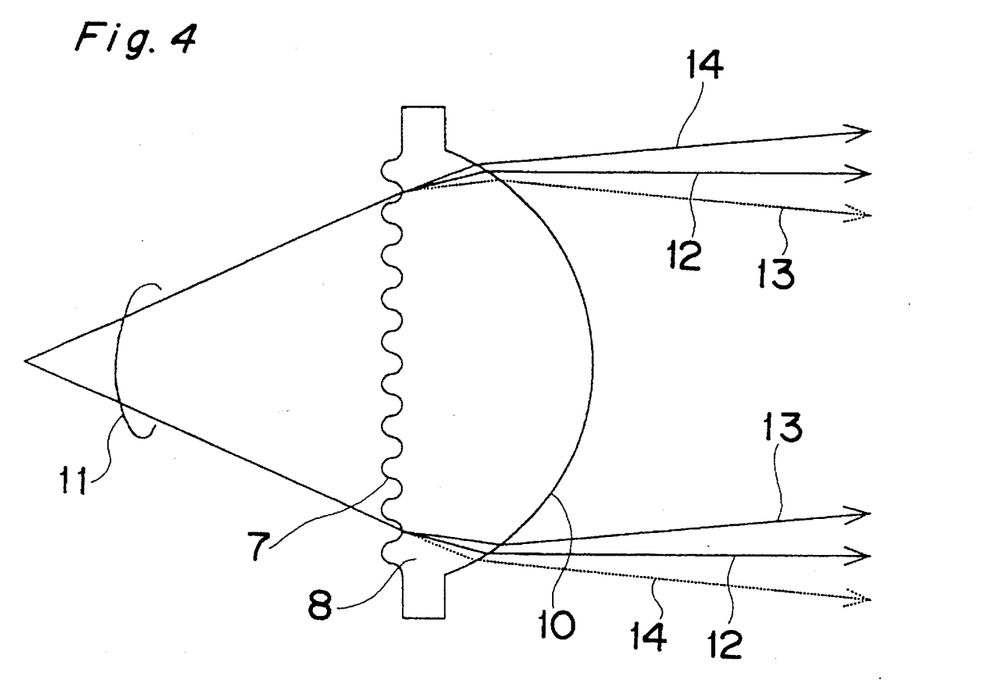
FIG. 4 is a schematic side representation of a complex lens according to a second preferred embodiment of the present invention.
Figure 5:
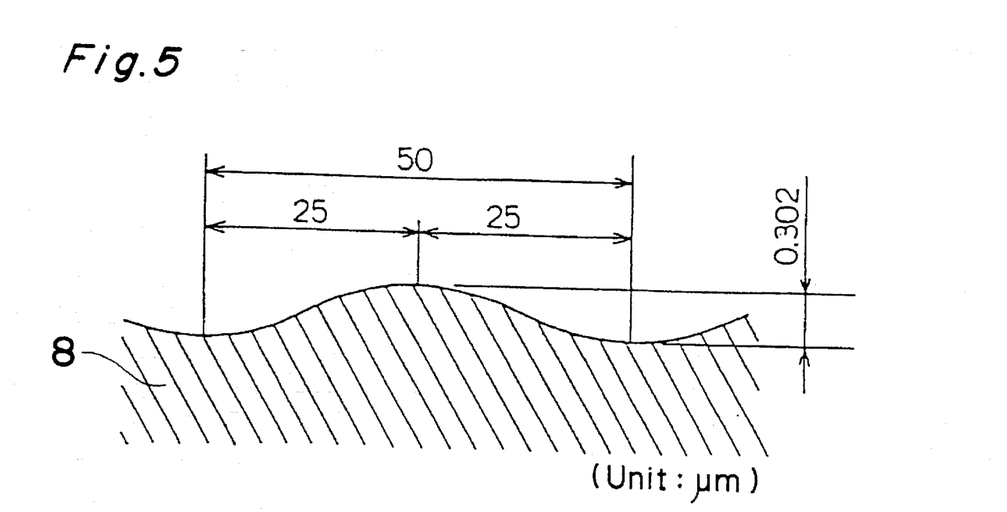
FIG. 5 is a fragmentary sectional representation, on an enlarged scale, of a portion of the complex lens of FIG. 4, showing details of grating dimensions.

Referring now to FIGS. 4 and 5 showing a second preferred embodiment of the present invention, a complex lens generally identified by 8 in FIG. 4 is in the form of a plano-convex lens having flat and convex lens surfaces 7 and 10. The flat lens surface 7 of the plano-convex lens is, in accordance with the present invention, formed with a diffraction grating to complete the complex lens 8.

In FIG. 4, reference numeral 11 represents a bundle of diverging rays of light emitted from a light source; reference numeral 12 represents a zero-order diffracted ray of light; and reference numerals 13 and 14 represents a + first-order diffracted ray of light and a − first-order diffracted ray of light.

As indicated above, the flat surface 7 of the plano-convex lens is formed with the diffraction grating. Therefore, the rays of light 11 from the light source are, as they pass across the complex lens 8, diffracted by the diffraction grating to provide the generally parallel rays of light 12, 13 and 14 that emerge outwardly from the convex lens surface 10 of the complex lens 8.

Referring now to FIG. 4 showing the details of a portion of the diffraction grating formed on the flat lens surface 7, the diffraction grating according to the second preferred embodiment of the present invention has a periodic structure of parallel grating ridges each being of a generally sinusoidal configuration. The dimensions of each grating ridge are shown therein in units of micrometers.

The diffraction grating formed on the flat lens surface 7 of the complex lens 8 according to the second preferred embodiment of the present invention has the following characteristics, wherein $I_1/I_0$ represents the ratio of the intensity of the ± first-order diffracted rays of light relative to that of the zero-order diffracted ray of light and $I_2/I_0$ represents the ratio of the sum of the respective intensities of the ± second or higher order diffracted rays of light relative to the intensity of the zero-order diffracted ray of light:

| | |
|---|---|
| Wavelength Used: | 785 nm |
| Refractive Index of Glass Material | 1.598799 |
| Grating Pitch: | 50 μm |
| 1st-order Diffraction Angle: | 0.9° |
| Depth of Grating Groove: | 0.302 μm |
| $I_1/I_0$ Ratio: | 0.150 |
| $I_2/I_0$ Ratio: | 0.010 |

The intensity ratio of the diffracted rays of light varies with the depth of each grating groove. In this second embodiment of the present invention, the groove depth is required to be within the range of 0.252 to 0.343 μm in order for the ratio $I_1/I_0$ to fall within the range of 0.150±0.05. Thus, as compared with the prior art diffraction grating having a multiplicity of parallel ridges of generally rectangular cross-section, it is clear that, where the grating grooves are so shaped as shown in FIGS. 4 and 5 according to the present invention, a tolerance which is about 1.4 times that afforded in the prior art diffraction grating can be secured, making it possible to increase the yield of manufacture of the complex lens elements. Moreover, since the $I_2/I_0$ ratio can be reduced down to 15% or lower of that exhibited by the prior art diffraction grating, a maximized utilization of a laser beam is possible.

Also, in this second preferred embodiment of the present invention, because each grating ridge in the diffraction grating formed on the flat lens surface 7 of the complex lens 8 is of a generally sinusoidal configuration having opposite sides inclined substantially at an angle of 2.46°, massproductivity of the complex lens 8 according to the second embodiment of the present invention by the use of a glass molding process is superior to that of the prior art diffraction grating.

Figure 6:
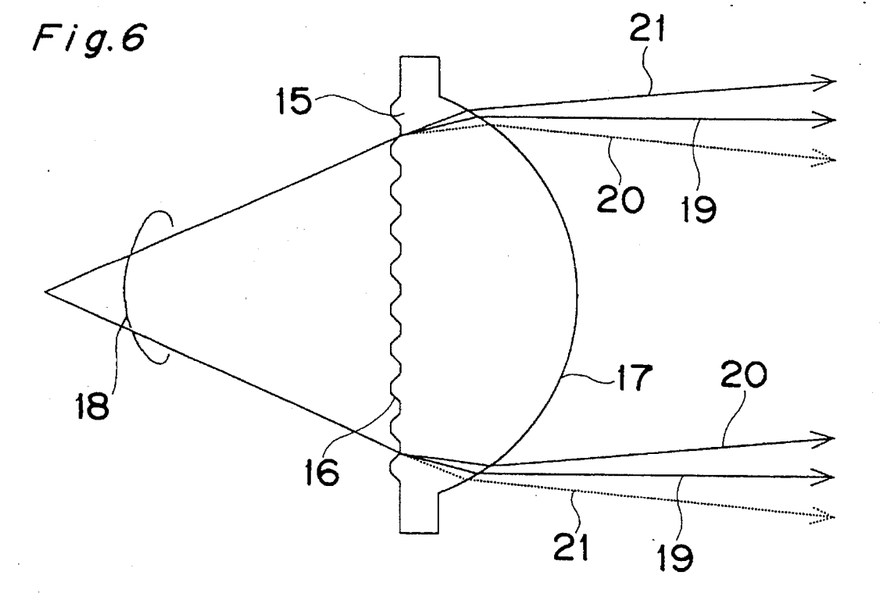
FIG. 6 is a schematic side representation of a complex lens according to a third preferred embodiment of the present invention.
Figure 7:
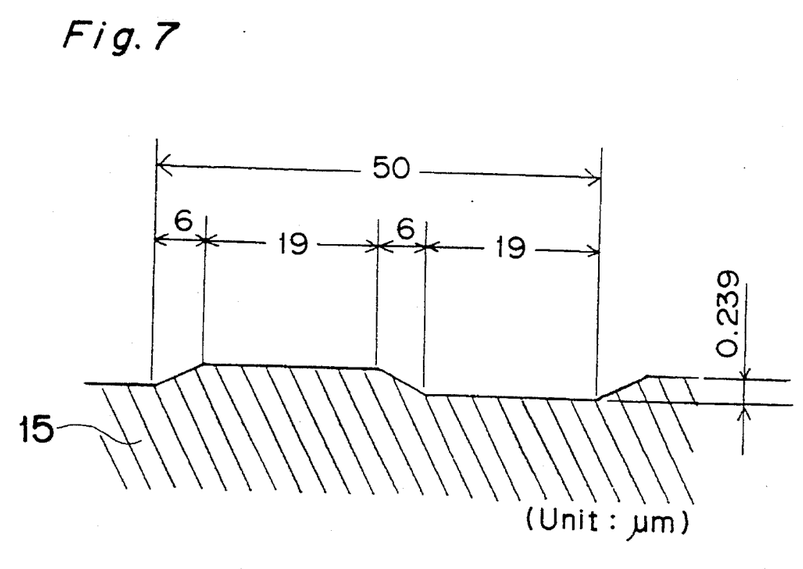
FIG. 7 is a fragmentary sectional representation, on an enlarged scale, of a portion of the complex lens of FIG. 6, showing details of grating dimensions.

Referring now to FIGS. 6 and 7 showing a third preferred embodiment of the present invention, a complex lens generally identified by 15 in FIG. 6 is in the form of a plano-convex lens having flat and convex lens surfaces 16 and 17. The flat lens surface 15 of the plano-convex lens is, in accordance with the present invention, formed with a diffraction grating to complete the complex lens 15.

In FIG. 6, reference numeral 18 represents a bundle of diverging rays of light emitted from a light source; reference numeral 19 represents a zero-order diffracted ray of light; and reference numerals 20 and 21 represents a + first-order diffracted ray of light and a − first-order diffracted ray of light.

As indicated above, the flat surface 16 of the planoconvex lens is formed with the diffraction grating. Therefore, the rays of light 18 from the light source are, as they pass across the complex lens 15, diffracted by the diffraction grating to provide the generally parallel rays of light 19, 20 and 21 that emerge outwardly from the convex lens surface 17 of the complex lens 15.

Referring now to FIG. 7 showing the details of a portion of the diffraction grating formed on the flat lens surface 16, the diffraction grating according to the third preferred embodiment of the present invention has a periodic structure of parallel grating ridges each being of a generally trapezoidal configuration. The dimensions of each grating ridge are shown therein in units of micrometers.

The diffraction grating formed on the flat lens surface 16 of the complex lens 15 according to the third preferred embodiment of the present invention has the following characteristics, wherein $I_1/I_0$ represents the ratio of the intensity of the ± first-order diffracted rays of light relative to that of the zero-order diffracted ray of light and $I_2/I_0$ represents the ratio of the sum of the respective intensities of the ± second- or higher order diffracted rays of light relative to the intensity of the zero-order diffracted ray of light:

| | |
|---|---|
| Wavelength Used: | 785 nm |
| Refractive Index of Glass Material | 1.598799 |
| Grating Pitch: | 50 μm |
| 1st-order Diffraction Angle: | 0.9° |
| Depth of Grating Groove: | 0.239 μm |
| $I_1/I_0$ Ratio: | 0.150 |
| $I_2/I_0$ Ratio: | 0.020 |

Even in this third embodiment of the present invention, the $I_2/I_0$ ratio can be reduced down to about 40% of that exhibited by the prior art diffraction grating, and a maximized utilization of a laser beam is possible. Also, in this third preferred embodiment of the present invention, because each grating ridge in the diffraction grating formed on the flat lens surface 16 of the complex lens 15 is of a generally trapezoidal configuration having opposite sides inclined substantially at an angle of 1.20°, mass-productivity of the complex lens 8 according to the second embodiment of the present invention, by the use of a glass molding process, is superior to that of the prior art diffraction grating.

Figure 8:
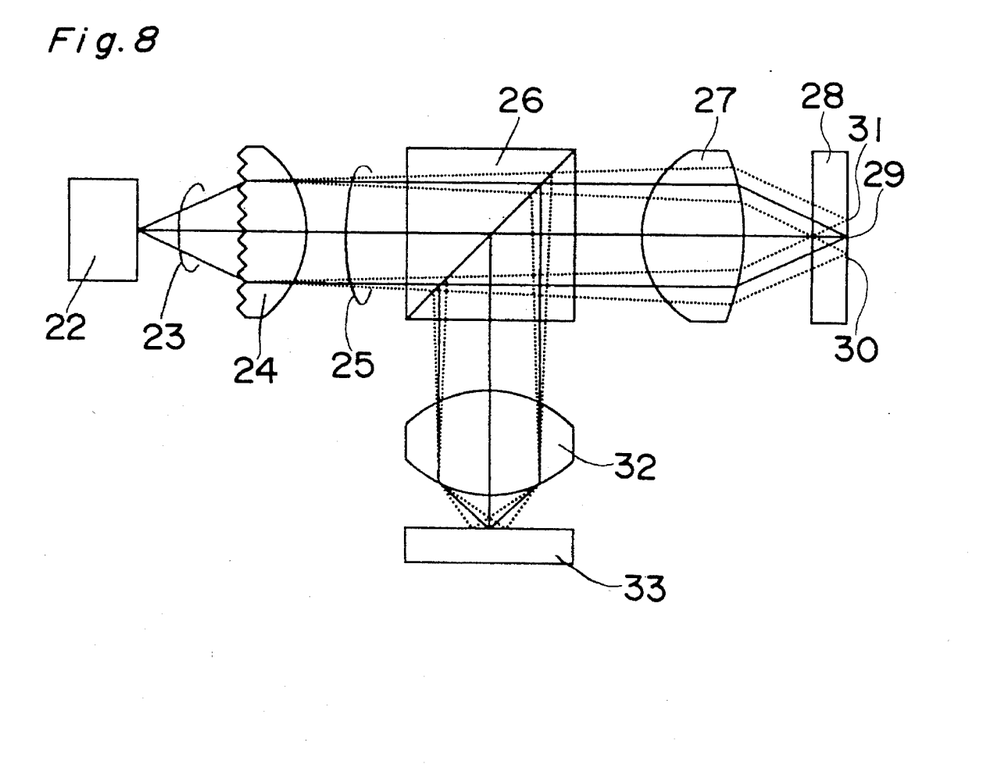
FIG. 8 is a schematic side representation of an optical head system utilizing the complex lens of the present invention.

An optical head utilizing the complex lens according to any one of the foregoing preferred embodiments of the present invention is shown in FIG. 8. As shown therein, a bundle of diverging rays of light 23 emitted from a semiconductor laser 22 impinges upon the complex lens now identified by 24. The complex lens 24 is in the form of a plane-convex lens having flat and convex lens surfaces opposite to each other with the diffraction grating formed on the flat lens surface thereof in accordance with any one of the foregoing embodiments of the present invention by the use of the glass molding technique. The rays of light 23 incident on the complex lens 24 are diffracted into the zero-order diffracted ray (shown by the solid line) and ± first-order diffracted rays of light (shown by the dotted lines) which, after having been collimated into generally parallel rays of light 25 as they pass across the complex lens 24, emerge outwardly from the complex lens 24. These collimated rays of light 25 are then focused by an objective lens 27 on an information recording medium 28, for example, an optical disc, to thereby form a main light spot 29 and two auxiliary light spots 30 and 31 on the information recording medium 28.

Rays of light reflected from the information recording medium 28 after having been rendered parallel by the objective lens 27, enter a beam splitter 26 by which they are deflected in a direction transverse to the direction of travel of the light from the semiconductor laser 22 towards the information recording medium 28, so as to travel towards a light receiving element 33. The light receiving element 33 upon receipt of the reflected light, generates a tracking control signal in a manner well known to those skilled in the art.

From the foregoing description, it is clear that the present invention is featured in that the diffraction grating and the collimator lens, which are separate from each other and which have hitherto been used in the three-beam optical head, are integrated together in the form of a complex lens of one-piece construction.

The prior art optical system wherein the separate elements are employed for the collimator lens and the diffraction grating, has problems such that a positioning error and changes in ambient parameters, such as, for example, ambient temperature result in a failure to properly and accurately position these separate elements relative to each other accompanied by a displacement in the angle of diffraction. Once this occurs, the spacing between the spots 29, 30 and 31 formed on the image recording medium tend to vary, rendering it instable to accomplish a tracking control of the objective lens.

According to the present invention, since the complex lens is a glass molded lens integrally formed with the diffraction grating having a multiplicity of parallel ridges of generally triangular cross-section as hereinbefore discussed, there is no possibility of the diffraction grating and the collimator lens being displaced in position relative to each other, and the present invention is, therefore, effective to provide an optical head capable of exhibiting a stable performance relative to changes in ambient parameters and also capable of accomplishing a satisfactory and accurate tracking control.

Moreover, since the use of the separate elements is dispensed with to form the complex lens, not only can the number of component parts of the optical head be minimized, but also the use of the complex lens contributes to a reduction in overall size and/or dimensions of the resultant optical head. Again, since the diffraction grating on the complex lens has a periodic structure of parallel ridges of generally triangular cross-section, the generation of the ± second or higher order diffracted rays of light, which are unnecessary for tracking control, is minimized, rendering the head of the present invention to achieve a maximized utilization of the laser beam.

Although the present invention has been described in connection with the preferred embodiments thereof and with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A one-piece complex lens, comprising a unitary molded block made of glass having a first lens surface thereon and a second lens surface thereon opposite to said first lens surface, wherein one of said first and second lens surfaces comprises a diffraction grating having a multiplicity of substantially parallel grating grooves each having a substantially triangular cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens;

wherein each of said grating grooves is defined by two oppositely disposed sides of adjacent grating ridges, said oppositely disposed sides being inclined at a predetermined angle;

wherein said predetermined angle is 0.7° relative to a plane parallel to said diffraction grating as a whole; and wherein said first lens surface comprises said diffraction grating and said second lens surface comprises a convex collimating lens.

2. A one-piece complex lens, comprising a unitary molded block made of glass having a first lens surface thereon and a second lens surface thereon opposite to said first lens surface, wherein one of said first and second lens surfaces comprises a diffraction grating having a multiplicity of substantially parallel grating grooves each having a substantially sinusoidal cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens;

wherein each of said grating grooves is defined by two oppositely disposed sides of adjacent grating ridges along a sinusoidal curve, said oppositely disposed having a predetermined inclination angle;

wherein said predetermined inclination angle is substantially 2.46° relative to a plane parallel to said diffraction grating as a whole; and wherein said first lens surface comprises said diffraction grating and said second lens surface comprises a convex collimating lens.

3. A one-piece complex lens, comprising a unitary molded block made of glass having a first lens surface thereon and a second lens surface thereon opposite to said first lens surface, wherein one of said first and second lens surfaces comprises a diffraction grating having a multiplicity of substantially parallel grating grooves each having a substantially trapezoidal cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens;

wherein each of said grating grooves is defined by two oppositely disposed sides of adjacent grating ridges having a groove bottom surface therebetween, said oppositely disposed sides being inclined at a predetermined angle;

wherein said predetermined angle is 1.20° relative to a plane parallel to said diffraction grating as a whole;

wherein said first lens surface comprises said diffraction grating and said second lens surface comprises a convex collimating lens.

4. An optical head for a three beam tracking system, comprising:

a light source for emitting a bundle of diverging rays of light in a first direction;

a one-piece complex lens, comprising a unitary molded block having a first lens surface thereon and a second lens surface thereon opposite to said first lens surface, wherein one of said first and second lens surfaces comprises a diffraction grating having a multiplicity of substantially parallel grating grooves each having a substantially triangular cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens, wherein each of said grating grooves is defined by two oppositely disposed sides of adjacent grating ridges, said oppositely disposed sides being inclined at a predetermined angle, wherein said predetermined angle is 0.7° relative to a plane parallel to said diffraction grating as a whole, and wherein said first lens surface comprises said diffraction grating and said second lens surface comprises a convex collimating lens, said collimating lens and said diffracting grating and said second lens surface comprises a convex collimating lens, said collimating lens and said diffracting grating being disposed relative to said light source such that the bundle of diverging rays of light is diffracted and collimated to produce substantially parallel rays of outgoing light;

a focusing lens for focusing the substantially parallel rays of light on an information recording medium;

a beam splitter for separating light reflected or transmitted from the information recording medium and deflecting it in a direction different than the first direction; and a light receiver for receiving the light separated by said beam splitter.

5. An optical head for a three beam tracking system, comprising:

a light source for emitting a bundle of diverging rays of light in a first direction;

a one-piece complex lens, comprising a unitary molded block made of glass having a first lens surface thereon and a second lens surface thereon opposite to said first lens surface, wherein one of said first and second lens surfaces comprises a diffraction grating having a multiplicity of substantially parallel grating grooves each having a substantially sinusoidal cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens, wherein each of said grating grooves is defined by two oppositely disposed sides of adjacent grating ridges along a sinusoidal curve, said oppositely disposed having a predetermined inclination angle, wherein said predetermined inclination angle is substantially 2.46° relative to a plane parallel to said diffraction grating as a whole, wherein said first lens surface comprises said diffraction grating and said second lens surface comprises a convex collimating lens, said collimating lens and said diffracting grating being disposed relative to said light source such that the bundle of diverging rays of light is diffracted and collimated to produce substantially parallel rays of outgoing light;

a focusing lens for focusing the substantially parallel rays of light on an information recording medium;

a beam splitter for separating light reflected or transmitted from the information recording medium and deflecting it in a direction different than the first direction; and a light receiver for receiving the light separated by said beam splitter.

6. An optical head for a three beam tracking system, comprising:

a light source for emitting a bundle of diverging rays of light in a first direction;

a one-piece complex lens, comprising a unitary molded block made of glass having a first lens surface thereon and a second lens surface thereon opposite to said first lens surface, wherein one of said first and second lens surfaces comprises a diffraction grating having a multiplicity of substantially parallel grating grooves each having a substantially trapezoidal cross-section, and wherein said first lens surface and said second lens surface together define a means for diffracting light incoming to said one of said first lens surface and said second lens surface and providing from the other of said first lens surface and said second lens surface outgoing light comprising at least three diffracted rays of light of zero order and ± first order so as to form respective light spots at different positions on an image forming plane of said complex lens, wherein each of said grating grooves is defined by two oppositely disposed sides of adjacent grating ridges having a groove bottom surface therebetween, said oppositely disposed sides being inclined at a predetermined angle, wherein said predetermined angle is 1.20° relative to a plane parallel to said diffraction grating as a whole, and wherein said first lens surface comprises said diffraction grating and said second lens surface comprises a convex collimating lens, said collimating lens and said diffracting grating being disposed relative to said light source such that the bundle of diverging rays of light is diffracted and collimated to produce substantially parallel rays of outgoing light;

a focusing lens for focusing the substantially parallel rays of light on an information recording medium;

a beam splitter for separating light reflected or transmitted from the information recording medium and deflecting it in a direction different than the first direction; and a light receiver for receiving the light separated by said beam splitter.

* * * * *